United States Patent [19]

Turloff

[11] Patent Number: 5,164,708
[45] Date of Patent: Nov. 17, 1992

[54] SINGLE UNIT, MULTI SIGNAL, VARIABLE PLANE MEASURING AND LEVELING DEVICE

[75] Inventor: Harry E. Turloff, Port Huron, Mich.
[73] Assignee: Harry Turloff, Lakeport, Mich.
[21] Appl. No.: 299,788
[22] Filed: Jan. 19, 1989
[51] Int. Cl.⁵ .............................................. G08B 21/00
[52] U.S. Cl. ...................................... 340/620; 33/366; 33/367; 73/308; 200/84 R
[58] Field of Search ................. 33/366, 367; 340/620; 73/305–308; 200/84 R

[56] References Cited

U.S. PATENT DOCUMENTS

| | | | |
|---|---|---|---|
| 3,849,898 | 11/1974 | Turloff | 33/367 |
| 4,182,046 | 1/1980 | Ludlow et al. | 33/366 |
| 4,231,163 | 11/1980 | Turloff | 33/367 |
| 4,590,680 | 5/1986 | Hanchett et al. | 33/366 |
| 4,720,920 | 1/1988 | Tudek | 33/366 |

Primary Examiner—Edward L. Coles, Sr.
Assistant Examiner—Jill Jackson
Attorney, Agent, or Firm—Krass & Young

[57] ABSTRACT

The invention is an improved level indicating and elevation indicating system using a hose containing fluid having a first and a second end, capable of being operated by a single person. An electronic method is used to indicate when a float at the first end of the hose is at, above, or below a reference. In the preferred embodiment, such indications are communicated through wires to three distinct lights at the second end of the hose, and a sight is used to determine accurately the position of a float at the second end. The preferred embodiment also includes a sleeve supporting the first end of the hose and a support for the sleeve. Also included are a vertical fixed rod for supporting the second end of the hose, a base for holding the fixed rod in virtually any position, and an adjustable rod (parallel to the fixed rod) for determining vertical offset distances. A pinching device, for slightly varying the volume of the hose, is also part of the preferred embodiment.

18 Claims, 5 Drawing Sheets

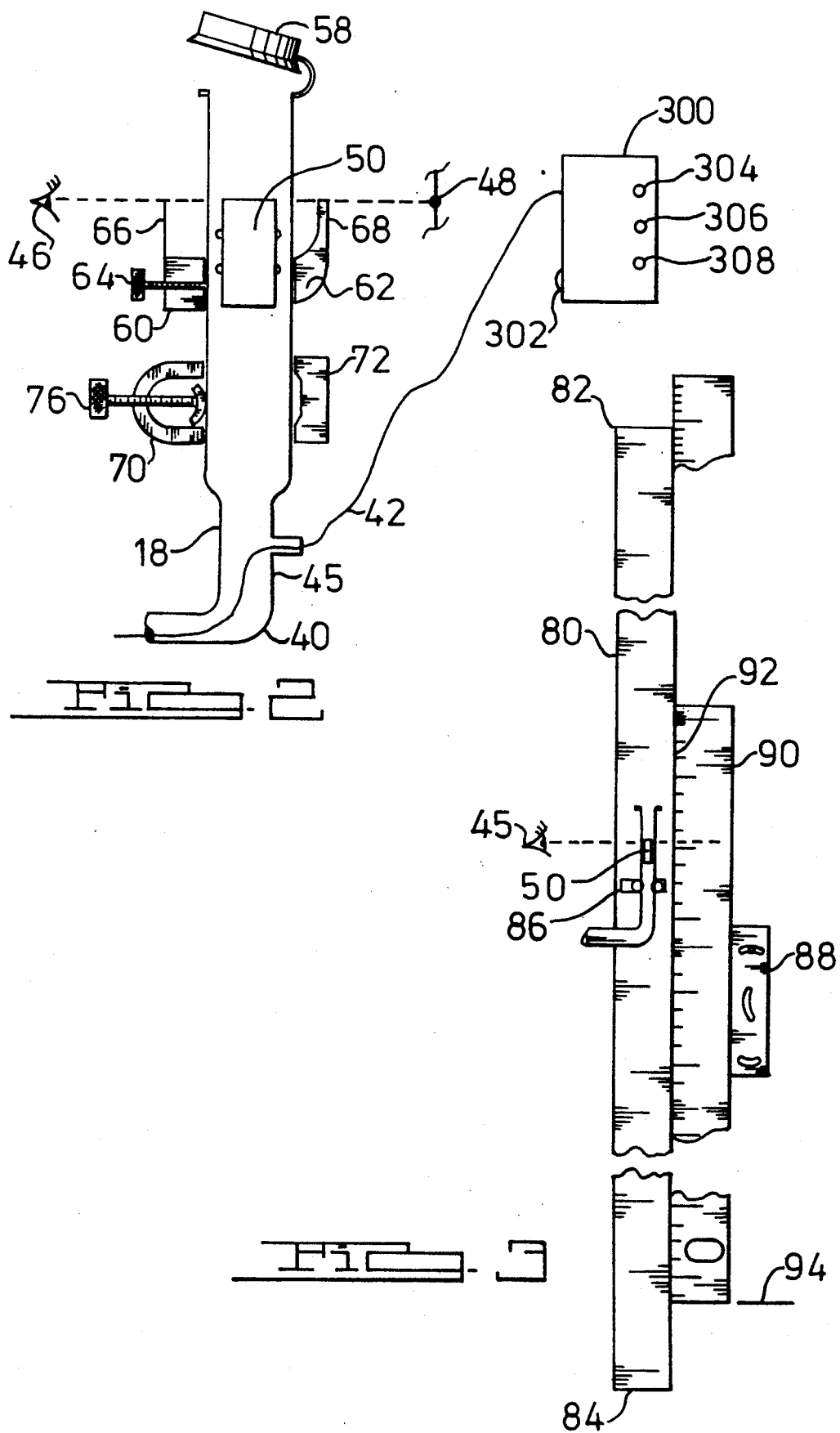

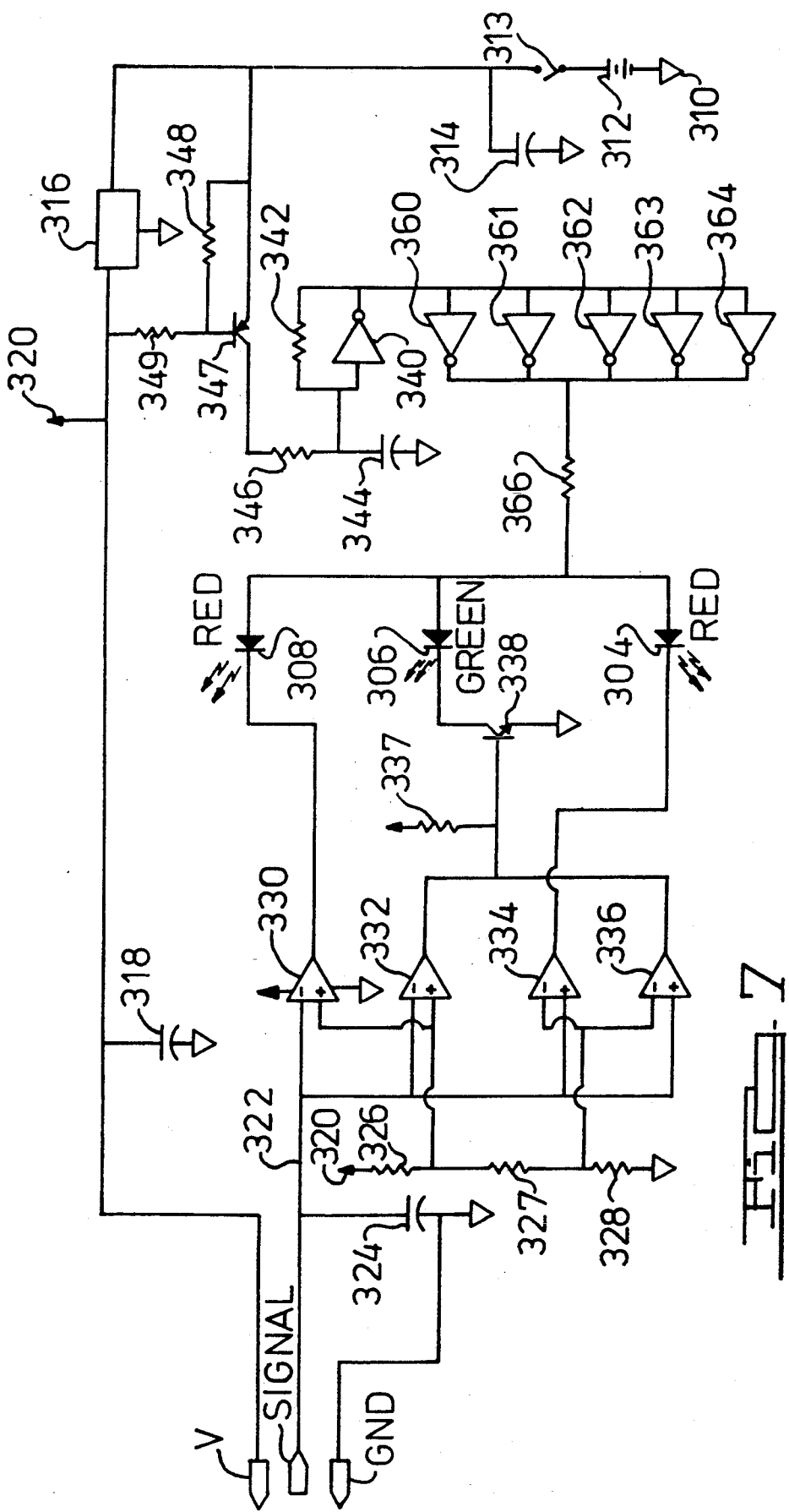

SINGLE UNIT, MULTI SIGNAL, VARIABLE PLANE MEASURING AND LEVELING DEVICE

RELATED DISCLOSURE DOCUMENT

Disclosure document number 162553 entitled "Accurate Level Indicator Improvements" was received in the Patent and Trade Mark Office on Jan. 21, 1987.

FIELD OF THE INVENTION

This invention relates to improvements in level indicating and elevation indicating devices and apparatuses that use a hose containing fluid.

BACKGROUND OF THE INVENTION

The level indicating and elevation indicating system of the present invention is an improvement and an extension of the device and apparatus of my prior U.S. Pat. Nos. (4,231,163 and 3,849,898).

Mechanical methods for detecting when the surface of a fluid, or a float supported by fluid, has reached a specified level are known. Such methods require part of the buoyancy force of a float to be used to actuate a switch. This may be done by a float moving a magnet close enough to a magnetically actuating switch or by pushing against switch contacts. Such mechanical methods have the characteristic low repeatability and hysteresis of force actuated switches made worse by the inherent elasticity of a float supported by fluid. Additionally, they must be protected from the dirt, dust, and corrosive vapors likely to be present.

Electric methods for detecting when the surface of a fluid has reached a specified level are known. Such methods act by using the decrease of resistance between electrodes that penetrate into the hose when the electrodes are covered by a conducting fluid. For such methods to operate, the fluid used must be conductive, the electrodes must be able to be insulated from each other, and the resistance between the electrodes and the fluid must stay within limits. Since many low cost conductive fluids tend to be chemically active (such as water plus acid or water plus a metallic salt) one must use some care in handling the fluids and one will prefer to use electrodes of a noble metal. U.S. Pat. No. 4,434,561 teaches the use of a fluid having at least the conductivity of "tap water" when the electrodes are used with an amplifier. The same patent shows the characteristic of such an electric method to have a single indicator.

At best, the known methods may be able to indicate either that the level of the surface of a fluid is within some small distance of, or below, a reference or, in the alternative, that the level of the surface of a fluid is within some small distance, or above, a reference. There is therefore a need in the art to provide a method for accurately determining when the level of the surface of an arbitrary fluid is within a certain small distance of a reference, above the same certain small distance of a reference, or below the same certain small distance of a reference. Without such a last described method, the overall accuracy and repeatability of such systems is significantly limited.

It has been known to sight across the surface of a fluid to a target point. Such surfaces are not flat, but have significant curvature due to the surface tension of the fluid and the lack of "wetting" of many fluids. This results in some uncertainty as to what the level of the surface is and some parallax error. There is therefore a need in the art for a method of accurately determining a horizontal plane that is a fixed distance from the surface of the fluid.

SUMMARY OF THE INVENTION

The preferred embodiment of the present invention is an improved level indicating and elevation indicating system using a hose containing fluid where an electronic method is used to indicate when a float at the first end of the hose is at, above, or below a reference, such indications are communicated through wires to three distinct lights at the second end of the hose, and an improved sight is used to determine accurately the position of a float at the second end. The system also includes a sleeve supporting the first end of the hose, a support for the sleeve, a vertical fixed rod for supporting the second end of the hose, a base for holding the fixed rod vertically regardless of the slope of the base, and an adjustable rod (parallel to the fixed rod) for determining vertical offset distances. The sleeve is also used to support temporarily the second end when the system is calibrated or to hold the second end while the whole system is transported. A pinching device, for slightly varying the volume of the hose, is also part of the system.

The preferred embodiment of the invention is advantageous in that one person is able to operate the entire system, it may be used to monitor changes of level over time, it simplifies the arithmetic used to calculate elevations because fractions of an inch may be eliminated from the reference height by adjustments of the sleeve, and because the reference height may remain the same when advancing distances greater than the length of the hose.

Alternative embodiments use wireless communication, use distinct sounds in lieu of distinct lights, use a micrometer type of adjustable rod, or simply use the improved sight on both ends of a hose.

BRIEF DESCRIPTION OF THE DRAWINGS

One will better understand the present invention by referring to the following detailed description while consulting the accompanying drawings, where the same reference numerals are used to refer to the same parts throughout the several views, and in which:

FIG. 2 is a cross section view of the hose-end showing its parts, the outside of the signal box, and how one's eye aligns with the front sight, hose float, rear sight, and target.

FIG. 3 is a perspective view of the split rod with the hose-end attached thereto.

FIG. 7 is an electronic schematic of the signal box circuit.

FIG. 8 is block diagram of alternative communication and display methods.

DETAILED DESCRIPTION OF THE PREFERRED EMBODIMENT

Figure 1:
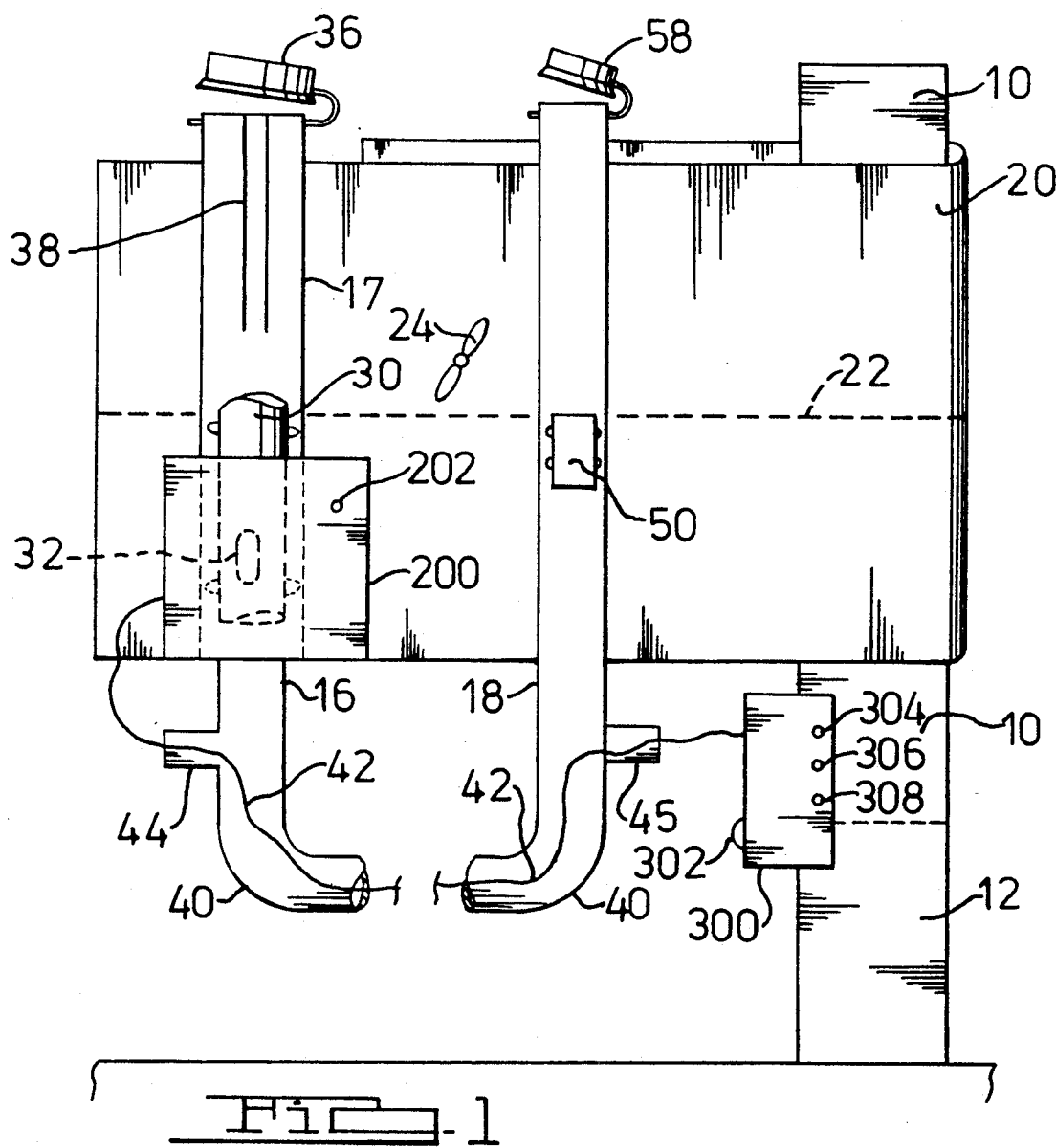
FIG. 1 is a perspective view of most of the parts of the invention, as they are arranged for calibration, and shows the control-end and hose-end mounted on the control sleeve, upper column, and lower column.

FIG. 1 shows the general nature of the system is a hose 40 almost entirely filled with a fluid, a control-end 16 of the hose 40 with a control-end-tube 17 containing a control float 30 within control box 200, and a hose-end 18 of the hose 40 containing hose float 50 and associated with signal box 300. The position of control float 30 is sensed by the electronics contained within control box 200, which is affixed to control sleeve 20. After calibration, the essence of the system's operation is that control box 200 communicates with signal box 300, through wires 42, when the fluid surface in control-end-tube 17 is above, below, or on a reference height and thus one knows whether hose float 50 is above, below, or on the same reference height. Below are described the details of various improvements to the basic system.

In FIG. 1 one sees how the invention is arranged for calibration. Calibration is the adjustment of the parts of the invention so only when a certain indication is received from signal box 300 is a reference height at the control-end 16 of the hose 40 in the same horizontal plane as hose float 50 found at the hose-end 18 of the hose 40. In the preferred embodiment, the indication of this same height condition is the assertion of the OK-light 306 in signal box 300. Calibration is effected by:

First: Temporarily and slidably attach the hose-end 18 onto control sleeve 20 to be vertical and parallel to the control-end-tube 17. This is the arrangement shown on FIG. 1.

Secondly: Remove control-end cap 36 and hose-end cap 58 so the fluid will balance at both ends of the hose.

Thirdly: Turn the electronics off (using on-off switch 302), cause the top of hose float 50 to be in the same horizontal plane as horizontal operating line 22 by adjusting the hose-end 18 vertically or changing the amount of fluid or varying the volume of hose 40; turn on the electronics (using on-off switch 302) and use electrical adjuster 202 to cause OK-light 306 to be asserted.

Lastly: Close cap 58 so that no fluid is lost.

Because of the various buoyancies of control float 30 and hose float 50, and because of the particular density of the fluid used, operating line 22 may not be in the same plane as the surface of the fluid when calibration is completed. Inherently, after calibration, whenever OK-light 306 is asserted and the fluid is not in motion, the top of hose float 50 is in the same horizontal plane as operating line 22.

FIG. 1 also shows a preferred method for maintaining control float 30 within sensing range of control box 200. This is effected by mechanical float limiter 38 comprising a hollow rod, open at both ends, removably attached to the top of the control-end-tube 17. When mechanical float limiter 38 is removed, control float 30 is readably accessible merely by elevating the hose-end 18 and grasping the control float 30 as it bobs to the top of the control-end-tube 17. When mechanical float limiter 38 is in place, control float 30 is blocked from traveling beyond the high side sensing range of control box 200. The use of mechanical float limiter 38 significantly assists in making it possible for the control-end 16 to be unattended during normal operation.

Still further, FIG. 1 shows the preferred method of dressing the wires 42 communicating between the control box 200 and the signal box 300. Conveniently placed below control float 30 and hose float 50 are first T fitting 44 and second T fitting 45, respectively. The opposing arms of each T fitting are spliced into hose 40, allowing free passage of the fluid, and the perpendicular arm receives wires 42. Suitable caulking is used to prevent leakage of fluid. The wires 42 are placed within hose 40 between the two T fittings. This method of dressing the wires 42 results in the wires being protected by the hose 40 and in the convenience of merely having to run the hose between control-end-tube 17 and hose-end 18.

Even further, FIG. 1 indicates the construction of the control sleeve 20, upper column 10, and lower column 12. In the preferred embodiment, the control sleeve 20, upon which the control-end-tube 17 and control box 200 are attached, is constructed of a sheet of rigid transparent flat material that has been wrapped around the upper column 10 while the area touching the upper column 10 is plastic. The control sleeve 20 is clamped to upper column 10 by the squeezing action of wing nut & bolt 24 running between the front and back sides of control sleeve 20. Operating line 22 is perpendicular to both the upper column 10 and the control-end-tube 17. In the preferred embodiment, the upper column 10 and the lower column 12 are rigid cylinders of the same diameter, and are joined together using a headless screw and mating threads cut into the center of each cylinder. Thus the upper column 10 is able to be detached from the lower column 12. Furthermore, the upper column 10 (with attached control sleeve 20, control-end-tube 17, and control box 200) may be detached from the lower column 12 and moved to a place where it is desired to have operating line 22 be a reference.

FIG. 2 shows the hose-end 18 of the hose 40. The signal box 300 is found in the neighborhood of the hose-end 18, its connecting wires 42 enter hose 40 through second T fitting 45, and, due to its proximity, signal box 300 is readably visible to the operator at the hose-end 18. The signal box 300 may be temporarily attached to the hose-end 18. The top of hose float 50 is flat and the hose float 50 is constructed so that when the float is floating in fluid the flat top will be in a horizontal plane. To facilitate the determination of the horizontal plane tangent to the flat top of hose float 50, a hose float indicator 60 is placed around the hose-end 18 proximate to the hose float 50. The preferred embodiment of the hose float indicator 60 comprises a collar 62 of stiff material having an inside diameter slightly larger than the outside diameter of the hose-end 18, which is placed around the hose-end 18; an attachment device 64 that keeps the hose float indicator 60 in place; a front sight 66 in the form of a vertical pin imbedded in the front of collar 62; and a back sight 68 formed from a flat toped vertical projection of the back of collar 62. The front sight 66 is adjusted so that its tip and the top of back sight 68 lie in a horizontal plane when the hose-end 18 is vertical. Thus, as shown on FIG. 2, the projection of an operator's eye 46 (aligned with the top of front sight 66, the flat top of hose float 50, and the top of back sight 68) onto target-point 48, lies in a well defined horizontal plane. Assuming calibration was carried out as detailed above, if such an alignment occurs when OK-light 306 is asserted, and thus control float 30 is at its reference level, then target-point 48 is in the same horizontal plane as operating line 22. Once such a target-point 48 is found, one may measure vertical offsets from it. Such determinations are facilitated with the split rod and versatile base improvements detailed below.

Operating line 22 may well be projected onto a scale and will indicate some number of inches plus a fraction of an inch. Even zero offsets are more conveniently effected if the projection of operating line 22 lies on an integer number of inches. In principle, one could move the scale, however, that is usually neither possible nor desirable. What may be done is to loosen wing nut & bolt 24 and slide control sleeve 20 vertically until the projection of operating line 22 is on an integer value of inches (when OK-light 306 is asserted) and then tighten wing nut & bolt 24. Starting with an integer number of inches greatly simplifies, and makes more reliable, the arithmetic used to calculate offsets.

To facilitate the solution of the practical problem of aligning the top of front sight 66, the flat top of hose float 50, and the top of back sight 68, a precision fluid positioner 70 is provided. The precision fluid positioner 70 comprises a yoke 72 surrounding the hose 40 (at any convenient location below hose float 50) and the yoke 72 is held tightly against the hose 40 by pressure plate 74 that is urged against the hose 40 by the captive adjustment knob & screw 76. Thus, varying adjustment knob & screw 76 will change the volume of the hose 40 by a small amount and, in turn, will change the height of the hose float 50 by a small amount (while the surface of the fluid, in both ends, will always be in the same horizontal plane). It has been found that one may dispense with pressure plate 74 if one uses an adjustment knob & screw 76 having a blunt end touching the hose and this constitutes the preferred embodiment of the precision fluid positioner 70.

The objective of accurately determining points that are in the same horizontal plane as operating line 22 is effected by the following:

calibrate the system as detailed above;

move the hose-end 18 to the area where heights relative to operating line 22 are to be determined;

with control-end cap 36 and hose-end cap 58 removed and signal box 300 turned on (using on-off switch 302), raise the hose-end 18 until high-light 304 is asserted, then slowly lower the hose-end 18 until OK-light 306 is asserted;

slide hose float indicator 60 until the top of hose float 50 is approximately level with the top of front sight 66 and back sight 68 and then temporarily snug hose float indicator 60 to the hose 40 with attachment device 64;

sequence between making appropriate small changes to the elevation of the hose-end 18, adjusting the placement of the hose float indicator 60 to have the tops of the sights line up with the top of hose float 50, and adjusting the precision fluid positioner 70 until the top of hose float 50, the top of front sight 66, the top of back sight 68, and target-point 48 are all seen by observer's eye 46 to be in line while OK-light 306 is asserted; and mark, or otherwise note, target-point 48.

Once the hose float indicator 60 has been properly placed, one will find that it is close to the correct position after hose-end 18 has been moved to a new location.

In the preferred embodiment of the invention, the inside diameter of the control-end-tube 17 is larger than the inside diameter of the hose 40 and hose-end 18. This arrangement increases the effective sensitivity of the system.

Figure 4:
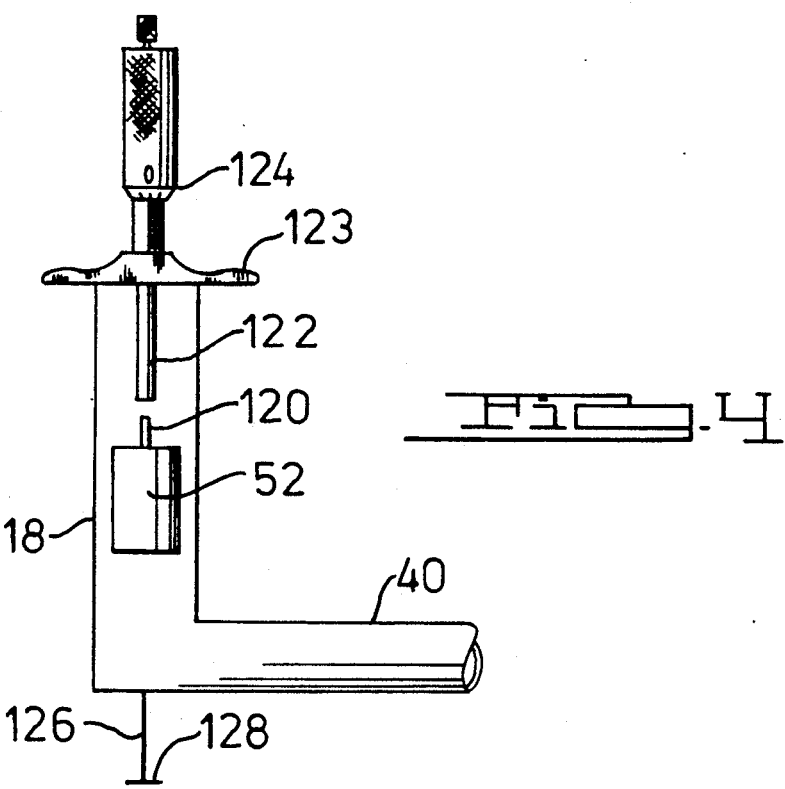
FIG. 4 is a perspective view of an alternative embodiment of the split rod that uses a micrometer.
Figures 5, 5A:
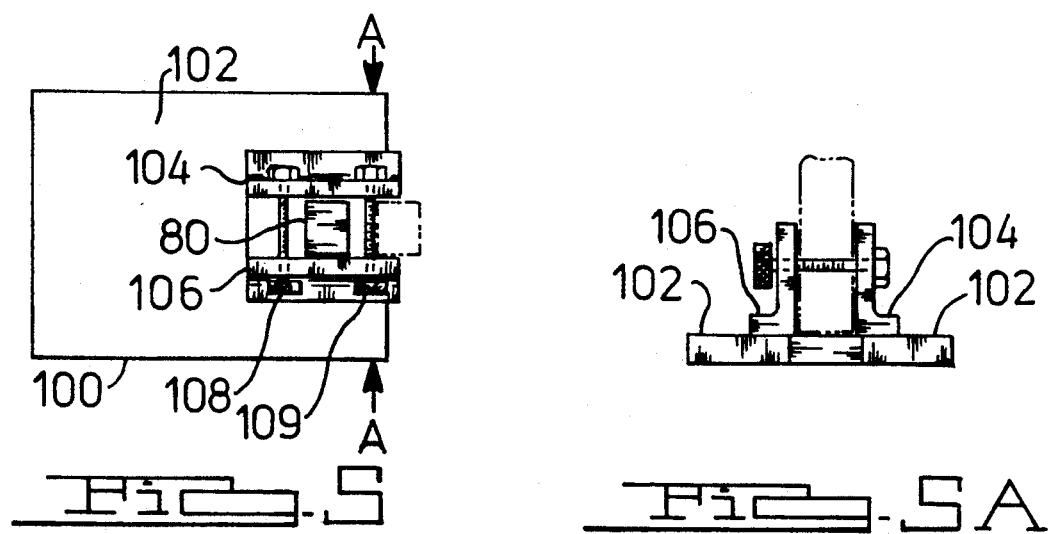
FIG. 5 is a top view of the versatile base and shows a rod clamped therein in cross section.
FIG. 5A is a cross section view of FIG. 5 through plane A-A.

The accurate determination of points that are a known distance above or below the horizontal plane containing operating line 22 is improved by the use of a split rod, shown on FIG. 3, and a versatile base, shown on FIG. 5 and FIG. 5A. The preferred embodiment of the split rod is comprised of a fixed rod 80 and an adjustable rod 90 that are interlocked in such a manner that they may slide vertically with respect to each other. The preferred embodiment uses a tongue-and-groove scheme to effect the sliding attachment. (An alternative embodiment is described later in this section and is shown on FIG. 4.) A scale 92 is placed along the entire length of adjustable rod 90. It may be convenient to have zero units start at foot 94. The hose-end 18 of the hose, with its attendant hose float 50, hose float indicator 60, precision fluid positioner 70, and signal box 300, is slidably clamped to fixed rod 80 by hose holder 86. The hose 40 may side vertically within hose holder 86 and the hose holder 86 may be moved vertically along fixed rod 80. Either the top of adjustable rod 90 is placed against a firm object above the hose-end 18, or fixed rod's bottom end 84 is braced against a firm object below the hose-end 18. Bubble level 88 is used to insure the split rod is vertical. The hose-end 18 is adjusted, in the manner described above, until OK-light 306 is asserted and thus the top of hose float 50 is in the same horizontal plane as operating line 22. Adjustable rod 90 is adjusted vertically until either its foot 94, or some other mark on the adjustable rod 90, is in the desired proximity to the point whose elevation relative to operating line 22 is to be measured. Hose float indicator 60 is used to find the target-point 48 on scale 92 and the difference in height is calculated as the difference between the target-point 48 and foot 94 (or whatever mark on adjustable rod 90 was used).

While the above process for finding relative vertical offsets from operating line 22 may readily be performed by one person, the use of versatile base 100 facilitates the process. FIG. 5 shows the versatile base 100. It comprises a flat rectangular plate 102 with an L bracket 104 attached thereto on one side of a rectangular opening. Fixed rod 80 may be clamped against the L bracket 104 by clamp 106, clamping nut & bolt 108, and clamping nut & bolt 109. Fixed rod 80 may be clamped between the two bolts or forward of clamping nut & bolt 109 so that part of fixed rod 80 protrudes forward of the edge of plate 102. The former position of fixed rod 80 allows the operator to position fixed rod 80 exactly with respect to a reference position by looking down through the opening. The later position of fixed rod 80 also allows fixed rod 80 to be positioned against a reference position that is forward of plate 102. In both cases, fixed rod's bottom end 84 may extend below, be above, or be flush with plate 102 and may also be inclined with respect to the plane of plate 102. Thus, by versatile base 100 being used to hold fixed rod 80, a very wide range of reference positions may be accommodated.

Figure 6:
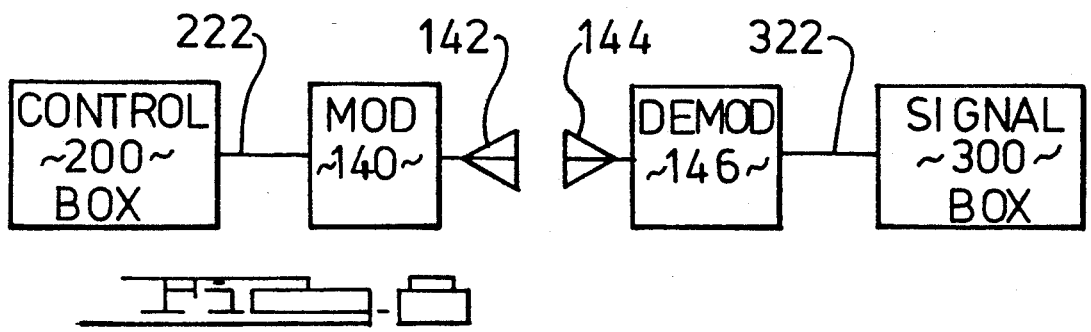
FIG. 6 is an electronic schematic of the control box circuit.
Figure 6:
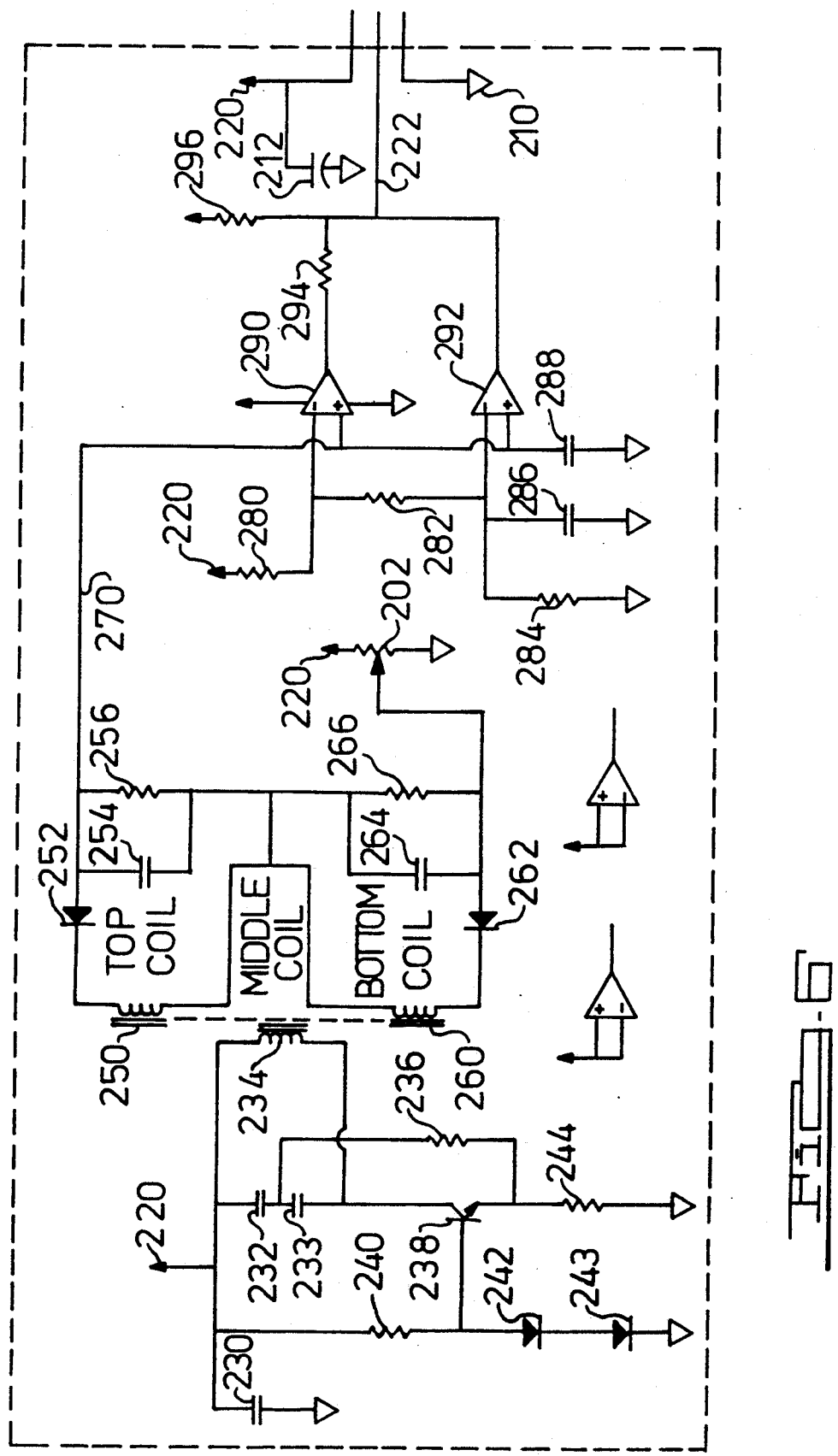

FIG. 6 shows the schematic of the preferred embodiment of the electronics of control box 200 and FIG. 1 shows the placement of control box 200 and the associated control float 30. Basically, the electronic method for producing an output signal dependent upon the fluid level is that of inductively exciting two vertically spaced coils with an ac signal, placing a high permeability core 32 within a control float 30 such that movement of the core will vary the amount of signal coupled into the vertically spaced coils, and forming the output signal from subtracting the voltages induced into the two vertically spaced coils. The vertically spaced coils are labeled 250 and 260 on FIG. 6.

The specifics of operation are as follows:

Regulated 5 volts 220 and electrical common 210 are brought into control box 200 by the method used to communicate with signal box 300 (wires 42 in the preferred embodiment) and these voltages are applied to the circuit as shown on FIG. 6.

A modified Colpitts oscillator is formed from capacitor 232, capacitor 233, middle coil 234, resistor 236, NPN transistor 238, resistor 240, diode 242, diode 243, and resistor 244. The operating frequency is principally determined by the inductance of middle coil 234 and the effective capacitance of capacitor 232 in series with capacitor 233. The amount of positive feedback is principally determined by the ratio of capacitor 233 to capacitor 232. Amplitude control is effected by the amplitude sensitive bias comprising resistor 240, forward biased diodes 242 and 243, and resistor 244. Middle coil 234 is placed between and essentially equidistant from top coil 250 and bottom coil 260 and each coil is wound around the control-end-tube 17 in the immediate vicinity of where the core 32 of the control float 30 is expected to be during operation of the system. Each coil is wound in the same direction.

Top coil 250 and bottom coil 260 are each connected to a rectifier circuit and the outputs of the rectifier circuits are connected in opposition. Diode 252, capacitor 254, and resistor 256 form the rectifier circuit for top coil 250, and diode 262, capacitor 264, and resistor 266 form the rectifier circuit for bottom coil 260. An adjustable amount of voltage may be added to the output of the rectifier circuit of bottom coil 260 by electrical adjuster 202. The difference voltage 270, relative to electrical common 210, is the sum of the positive voltage from electrical adjuster 202, the positive voltage from the rectifier applied to bottom coil 260, and the negative voltage from the rectifier applied to top coil 250, as these voltages are all in series.

Difference voltage 270 is applied to a three state logic circuit primarily formed from voltage comparator 290 and voltage comparator 292. Bypass capacitor 286 and bypass capacitor 288 help to stabilize the circuit. Regulated 5 volts 220 and resistors 280, 282, and 284 bias the negative-going input of voltage comparator 290 to roughly 2.53 volts and the negative going input of voltage comparator 292 to roughly 2.47 volts. (The voltages actually differ by about 60 mV.) The difference voltage 270 is connected to both positive-going inputs. The voltage comparators used are such that when the positive going input is more positive than the negative going input the output looks like an open, and when the negative going input is more positive than the positive going input then the output sinks current. Thus: (1) When the core 32 is below its reference, and difference voltage 270 is greater than 2.53 volts, the outputs of both voltage comparator 290 and voltage comparator 292 look like opens and signal voltage 222 is about 5 volts. (2) When the core 32 is above its reference, and difference voltage 270 is less than 2.47 volts, the outputs of both voltage comparator 290 and voltage comparator 292 sink current and signal voltage 222 is near zero. (3) When the core 32 is near its reference point the difference voltage 270 will be between about 2.53 volts and 2.47 volts resulting in the output of voltage comparator 292 looking like an open and the output of voltage comparator 290 sinking current through resistor 294 producing a signal voltage 222 between about 2.5 and zero volts. Only a small range of movement of core 32 about its reference point, as adjusted by electrical adjuster 202, causes full change in signal voltage 222.

The schematic of the electronics of signal box 300 is shown on FIG. 7. Basically the signal box 300 receives a signal voltage 322 that is essentially the same assignal voltage 222 sent by control box 200 (in the preferred embodiment, the two voltages are essentially the same), and applies same to a logic circuit that turns on the appropriate lamp. The logic circuit comprises four voltage comparators and an electronic scheme is used to blink the lights when the supply voltage becomes too low. Specifically:

Power is supplied by 9 volt battery 312 connected between electrical common 310 and on-off switch 302, and is filtered by filter capacitor 314. Voltage used by most of the electronics is provided by voltage regulator 316 producing regulated 5 volts 320, which is filtered by filter capacitor 318 and (in the preferred embodiment) is also sent to control box 200.

Regulated 5 volts 320 and resistors 326, 327, and 328 are used to bias the four voltage comparators with about 3.33 volts on the positive-going inputs of voltage comparator 330 and voltage comparator 332, and about 1.37 volts on the negative-going inputs of voltage comparator 334 and voltage comparator 336. Thus: (1) When signal voltage 322 is above about 3.33 volts (corresponding to core 32 being low) the outputs of voltage comparator 330 and voltage comparator 332 will sink current and the outputs of voltage comparator 334 and voltage comparator 336 will look like opens. This causes low-light 308 to be on, and both OK-light 306 and high-light 304 to be off. (2) When signal voltage 322 is below about 1.67 volts (corresponding to core 32 being high) the outputs of voltage comparator 330 and voltage comparator 332 look like opens and voltage comparator 334 and voltage comparator 336 are sinking current. This causes low-light 308 and OK-light 306 to be off and high-light 304 to be on. (3) When signal voltage 322 is between about 3.33 volts and 1.67 volts (corresponding to core 32 being near its reference point) all of the voltage comparators: outputs look like opens. This causes low-light 308 and high-light 304 to be off and, due to the inverting action of resistor 337 and NPN transistor 338, for OK-light 306 to be on.

When 9 volt battery 312 is supplying sufficient voltage so that the voltage drop across resistor 348 will keep PNP transistor 347 turned on, then the input of Schmidt trigger 340 is high, the output of Schmidt trigger 340 is low, the inputs of parallel inverters 360, 361, 361, 362, 363, and 364 are low, and about 5 volts is applied through resistor 366 to the anodes of high-light 304, OK-light 306, and low-light 308. However, when 9 volt battery 312 is no longer able to keep PNP transistor 347 on, Schmidt trigger 340 becomes a relaxation oscillator with a frequency determined primarily by capacitor 344 and resistor 342. The oscillations on the output of Schmidt trigger 340, and thus on the inputs of parallel inverters 360, 361, 361, 362, 363, and 364, will cause the lights to blink, warning of the low battery condition.

An alternative embodiment for the split rod, as described above, is shown on FIG. 4. This variation is particularly suited for the determination of very small variations in elevation. A pin 120 is placed in the end of alternative hose float 52 so as to be essentially on the same axis as a depth micrometer's probe 122 where the depth micrometer's flange 123 is placed on the top of hose-end 18 with depth micrometer's dial 124 accessible above hose-end 18. A leg 126 with a foot 128 is firmly attached to hose-end 18 below alternative hose float 52 and hose 40 is dressed away to the side. The fixed distance between flange 123 and foot 128 is equivalent to fixed rod 80 and the adjustable probe 122 is equivalent to adjustable rod 90. Some sort of a supporting structure (not shown) is required to loosely held hose-end 18 to maintain plumb, while permitting vertical adjustment to accomodate the surface below foot 128. The alternative embodiment shown on FIG. 4 is operated as follows:

Foot 128 is placed over the reference elevation and the system is adjusted until OK-light 306 is on. Then probe 122 is advanced downward until it just touches pin 120. Dial 124 is read and called the reference height.

Foot 128 is then placed over the next point to be measured and, when OK-light 306 is once again on, the probe 122 is advanced downward until it just touches pin 120. The difference in the dial readings is the elevation of the measured point with respect to the reference height.

An operator of this alternative embodiment will wish to use the fluid reservoir shown in my U.S. Pat. No. 4,231,163.

The floats used by the preferred embodiment have small bumps or short vertical protrusions on their sides to facilitate facile movement within the hose 40.

While the preferred embodiment, as described above, uses only one hose float indicator 60, mounted on hose-end 18, an alternative embodiment comprises a hose float 50, a hose-end cap 58, and a hose float indicator 60 mounted on both ends of hose 40. Thus both ends of the hose would look like FIG. 2 less signal box 300. This alternative embodiment requires an observer at each end (the preferred embodiment requires an observer only at the hose-end 18) and the observers must be able to communicate with each other. This scheme is advantageous in that it does not require any electronics for operation, and provides both better accuracy and quicker operation.

Alternate embodiments may be effected by the use of "wireless" methods for communicating between the control box 200 and the signal box 300. Such methods may take the form of modulated electromagnetic waves (such as light, or radio waves), or modulated mechanical waves (such as ultrasonic or sonic waves). FIG. 8 shows the arrangement. Control box 200 supplies its signal voltage 222 to modulator 140. The modulator 140 impresses the information on signal voltage 222 onto the electromagnetic or mechanical power emitted by wave launcher 142. Wave collector 144 receives some of the power emitted and supplies it to demodulator 146. Demodulator 146 removes the information and converts it into signal voltage 322 for processing by signal box 300.

A further alternative embodiment may be effected by substituting three different and distinct sounds for highlight 304, OK-light 306, and low-light 308.

A still further alternative embodiment may be effected by modifying the electronics so as to cause signal box 300 to indicate only whether control float 30 is too high or too low. The transition between these two indications is used in the same manner as the assertion of OK-light 306 in the preferred embodiment.

Although a preferred embodiment of the invention has been disclosed in detail, it will be recognized that variations or modifications lie within the scope of the present invention.

I claim:

1. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of three distinct and humanly perceptible signals depending on whether the fluid level detected by said electronic detection means is more than a small distance below the reference line or more than said small distance above the reference line or within said small distance of the reference line;

a float supported by the fluid at said second end of the hose, said float containing a reference mark that is within said small distance of the same level as the reference line when the fluid has been allowed to come to rest and when said humanly perceptible signal indicates the fluid level at the first end is within said small distance of the reference line, said float having a flat top, said flat top comprising said reference mark; and a sighting means for determining the horizontal plane tangent to said flat top.

2. An improved level indicating and elevation indication system using a hose containing fluid having a first and a second end, as related in claim 1, wherein said sighting means comprises:

a collar having a front and a back, surrounding the hose near said float, and capable of sliding on the hose;

attachment means for temporarily preventing said collar from moving relative to the hose;

a front sight formed from the top of a vertical projection from said front of said collar; and a back sight formed from the top of a vertical projection from said back of said collar, said top of said front sight and said top of said back sight lie in a plane that is essentially perpendicular to the hose.

3. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of three distinct and humanly perceptible signals depending on whether the fluid level detected by said electronic detection means is more than a small distance below the reference line or more than said small distance above the reference line or within said small distance of the reference line;

a float supported by the fluid at said second end of the hose, said float containing a reference mark that is within said small distance of the same level as the reference line when the fluid has been allowed to come to rest and when said humanly perceptible signal indicates the fluid level at the first end is within said small distance of the reference line; and a flexible section of hose and associated pinching means for varying the volume of the hose, said pinching means including a yoke having a front and a back, said yoke surrounding said flexible section of hose with said back of said yoke touching said flexible section of hose;

a pressure plate within said front of said yoke and touching said flexible section of hose, said pressure plate capable of movement towards and away from said flexible section of hose; and adjustable force varying means for changing the force with which said pressure plate touches said flexible section of hose, thereby allowing slight variations in the volume of the hose.

4. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of three distinct and humanly perceptible signals depending on whether the fluid level detected by said electronic detection means is more than a small distance below the reference line or more than said small distance above the reference line or within said small distance of the reference line;

a float supported by the fluid at said second end of the hose, said flat containing a reference mark that is within said small distance of the same level as the reference line when the fluid has been allowed to come to rest and when said humanly perceptible signal indicates the fluid level at the first end is within said small distance of the reference line; and a flexible section of hose and associated pinching means for varying the volume of the hose, said pinching means including a yoke having a front and a back, said yoke surrounding said flexible section of hose with said back of said yoke touching said flexible section of hose and with said front of said yoke having a threaded opening communicating with said flexible section of hose; and a threaded screw having a knob on one end and being blunt on the other end, said blunt end of said screw being threaded through said threaded opening and able to touch said flexible section of hose.

5. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of three distinct and humanly perceptible signals depending on whether the fluid level detected by said electronic detection means is more than a small distance below the reference line or more than said small distance above the reference line or within said small distance of the reference line;

a float supported by the fluid at said second end of the hose, said float containing a reference mark that is within said small distance of the same level as the reference line when the fluid has been allowed to come to rest and when said humanly perceptible signal indicates the fluid level at the first end is within said small distance of the reference line;

a stand having a horizontal foot and a lower column protruding vertically from said horizontal foot;

an upper column with essentially the same cross section as said lower column;

detachable fastener means for attaching said upper column to, and extending above, said lower column; and a sleeve slidably attached to said upper column, said sleeve vertically supporting the first end of the hose, said sleeve being capable of supporting the second end of the hose.

6. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of three distinct and humanly perceptible signals depending on whether the fluid level detected by said electronic detection means is more than a small distance below the reference line or more than said small distance above the reference line or within said small distance of the reference line;

a float supported by the fluid at said second end of the hose, said float containing a reference mark that is within said small distance of the same level as the reference line when the fluid has been allowed to come to rest and when said humanly perceptible signal indicates the fluid level at the first end is within said small distance of the reference line; and positioning means, affixed to said second end of the hose, for holding said reference mark, of said float, a fixed vertical distance from the horizontal plane containing the reference line when said humanly perceptible signal indicates the fluid level at the first end is within said small distance of the reference line, whereby points said fixed vertical distance from the horizontal plane containing the reference line may be ascertained.

7. An improved level indicating and elevation indication system using a hose containing fluid having a first and a second end, as related in 6, wherein said positioning means consists of a rod of stiff material having mean for holding said second end of the hose.

8. An improved level indicating and elevation indication system using a hose containing fluid having a first and a second end, as related in claim 7, further comprising:

a flat plate having a slot slightly wider than said rod, said slot being open to the front edge of said plate; and clamping means along said slot for restraining said rod with arbitrary orientation to said plate and with the end of said rod slightly above, below, or slightly in front of said plate.

9. An improved level indicating and elevation indication system using a hose containing fluid having a first and a second end, as related in claim 6, further comprising:

adjustable means, mounted parallel to said positioning means, for measuring the vertical distance between said reference mark and a point on said adjustable means when said humanly perceptible signal indicates the fluid level at the first end is within said small distance of the reference line, whereby the elevation of points from the horizontal plane containing the reference line may be ascertained.

10. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of two distinct and humanly perceptible signals depending on whether the fluid level detected by said electronic detection means is below the reference line or above the reference line;

a float supported by the fluid at said second end of the hose, said float containing a reference mark that is essentially the same level as the reference line when the fluid has been allowed to come to rest and when a transition of said humanly perceptible signals occurs, said float having a flat top, said flat top comprising said reference mark; and a sighting means for determining the horizontal plane tangent to said flat top.

11. An improved level indicating and elevation indication system using a hose containing fluid having a first and a second end, as related in claim 10, wherein said sighting means comprise:

a collar having a front and a back, surrounding the hose near said float, and capable of sliding on the hose;

attachment means for temporarily preventing said collar from moving relative to the hose;

a front sight formed from the top of a vertical projection from said front of said collar; and a back sight formed from the top of a vertical projection from said back of said collar, said top of said front sight and said top of said back sight lie in a plane that is essentially perpendicular to the hose.

12. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of two distinct and humanly perceptible signals depending on whether the fluid level detected by said electronic detection means is below the reference line or above the reference line;

a float supported by the fluid at said second end of the hose, said float containing a reference mark that is essentially the same level as the reference line when the fluid has been allowed to come to rest and when a transition of said humanly perceptible signals occurs; and a flexible section of hose and associated pinching means for varying the volume of the hose, said pinching means including a yoke having a front and a back, said yoke surrounding said flexible section of hose with said back of said yoke touching said flexible section of hose;

a pressure plate within said front of said yoke and touching said flexible section of hose, said pressure plate capable of movement towards and away from said flexible section of hose; and adjustable force varying means for changing the force with which said pressure plate touches said flexible section of hose, thereby allowing slight variations in the volume of the hose.

13. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of two distinct and humanly perceptible signals depending on whether the fluid level detected by said electronic detection means is below the reference line or above the reference line;

a float supported by the fluid at said second end of the hose, said float containing a reference mark that is essentially the same level as the reference line when the fluid has been allowed to come to rest and when a transition of said humanly perceptible signals occurs; and a flexible section of hose and associated pinching means for varying the volume of the hose, said pinching means including a yoke having a front and a back, said yoke surrounding said flexible section of hose with said back of said yoke touching said flexible section of hose and with said front of said yoke having a threaded opening communicating with said flexible section of hose; and a threaded screw having a knob on one end and being blunt on the other end, said blunt end of said screw being threaded through said threaded opening and able to touch said flexible section of hose.

14. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of two distinct and humanly perceptible signals depending on whether the fluid level detected by said electronic detection means is below the reference line or above the reference line;

a float supported by the fluid at said second end of the hose, said float containing a reference mark that is essentially the same level as the reference line when the fluid has been allowed to come to rest and when a transition of said humanly perceptible signals occurs;

a stand having a horizontal foot and a lower column protruding vertically from said horizontal foot;

an upper column with essentially the same cross section as said lower column;

detachable fastener means for attaching said upper column to, and extending above, said lower column; and a sleeve slidably attached to said upper column, said sleeve vertically supporting the first end of the hose, said sleeve being capable of supporting the second end of the hose.

15. An improved level indicating and elevation indication system using a hose containing fluid having a first and a second end, and a reference line adjacent to the first end, comprising:

electronic detection means, located at the first end of the hose, for producing an output signal as a function of fluid level at said first end of the hose relative to the reference line;

means for communicating said output signal of said electronic detection means to an indicating device near the second end of the hose, where said indicating device emanates one of two distinct and humanly perceptible signals depending on whether the fluid level detected by said electronic detection means is below the reference line or above the reference line;

a float supported by the fluid at said second end of the hose, said float containing a reference mark that is essentially the same level as the reference line when the fluid has been allowed to come to rest and when a transition of said humanly perceptible signals occurs; and positioning means, affixed to said second end of the hose, for holding said reference mark, of said float, a fixed vertical distance from the horizontal plane containing the reference line when a transition of said two humanly perceptible signals occurs, whereby points said fixed vertical distance from the horizontal plane containing the reference line may be ascertained.

16. An improved level indicating and elevation indication system using a hose containing fluid having a first and a second end, as related in claim 15, wherein said positioning means comprises a rod of stiff material having means for holding said second end of the hose.

17. An improved level indicating and elevation indication system using a hose containing fluid having a first and a second end, as related in claim 16, further comprising:

a flat plate having a slot slightly wider than said rod, said slot being open to the front edge of said plate; and clamping means along said slot for restraining said rod with arbitrary orientation to said plate and with the end of said rod slightly above, below, or slightly in front of said plate.

18. An improved level indicating and elevation indication system using a hose containing fluid having a first and a second end, as related in claim 15, further comprising:

adjustable means, mounted parallel to said positioning means, for measuring the vertical distance between said reference mark and a point on said adjustable means when a transition of said two humanly perceptible signals occurs, whereby the elevation of points from the horizontal plane containing the reference line may be ascertained.

* * * * *

UNITED STATES PATENT AND TRADEMARK OFFICE
CERTIFICATE OF CORRECTION

PATENT NO. : 5,164,708
DATED : November 17, 1992
INVENTOR(S) : Harry E. Turloff

It is certified that error appears in the above-indentified patent and that said Letters Patent is hereby corrected as shown below:

Column 8, Line 48, delete "361, 361" and insert --361--.

Column 8, Line 56, delete "361, 361" and insert --361--.

Signed and Sealed this

Twelfth Day of July, 1994

Attest:

BRUCE LEHMAN

*Attesting Officer*     *Commissioner of Patents and Trademarks*